United States Patent
Blinick et al.

(10) Patent No.: US 9,436,607 B2
(45) Date of Patent: *Sep. 6, 2016

(54) LOCKING A CACHE LINE FOR WRITE OPERATIONS ON A BUS

(71) Applicant: International Business Machines Corporation, Armonk, NY (US)

(72) Inventors: Stephen L. Blinick, Chandler, AZ (US); Charles S. Cardinell, Tucson, AZ (US); Roger G. Hathorn, Tucson, AZ (US); Bernhard Laubli, Tucson, AZ (US); Miguel A. Montoya, Tucson, AZ (US); Timothy J. Van Patten, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,868

(22) Filed: May 14, 2015

(65) Prior Publication Data

US 2015/0248351 A1 Sep. 3, 2015

Related U.S. Application Data

(63) Continuation of application No. 12/897,555, filed on Oct. 4, 2010, now Pat. No. 9,075,720.

(51) Int. Cl.
*G06F 12/00* (2006.01)
*G06F 12/08* (2016.01)
(Continued)

(52) U.S. Cl.
CPC ....... *G06F 12/0833* (2013.01); *G06F 12/0802* (2013.01); *G06F 12/1009* (2013.01); *G06F 12/127* (2013.01); *G06F 12/1475* (2013.01);
(Continued)

(58) Field of Classification Search
CPC .... G06F 12/00; G06F 12/08; G06F 12/0815; G06F 12/0888; G06F 13/00; G06F 12/0833; G06F 12/12; G06F 12/121; G06F 12/122; G06F 12/123
USPC .......................... 711/100, 117, 136, 154, 200
See application file for complete search history.

(56) References Cited

U.S. PATENT DOCUMENTS

| | | | | | |
|---|---|---|---|---|---|
| 5,276,848 | A | * | 1/1994 | Gallagher | G06F 12/0897 711/121 |
| 5,355,467 | A | * | 10/1994 | MacWilliams | G06F 12/0811 711/146 |

(Continued)

OTHER PUBLICATIONS

"Method for Model-Specific Register-Based Cache-Line Locking", Disclosed Anonymously, IP.com No. IPCOM000128945D, Sep. 21, 2005, pp. 1-3.

(Continued)

*Primary Examiner* — Tuan Thai
(74) *Attorney, Agent, or Firm* — David W. Victor; Konrad Raynes Davda & Victor LLP

(57) ABSTRACT

Provided are a computer program product, system, and method for locking a cache line for a burst write operations on a bus. A cache line is allocated in a cache for a target address. A lock is set for the cache line, wherein setting the lock prevents the data in the cache line from being cast out. Data is written to the cache line. All the data in the cache line is flushed to the target address over a bus in response to completing writing to the cache line.

21 Claims, 5 Drawing Sheets

(51) Int. Cl.
*G06F 12/12* (2016.01)
*G06F 12/10* (2016.01)
*G06F 12/14* (2006.01)

(52) U.S. Cl.
CPC ... *G06F 2212/1052* (2013.01); *G06F 2212/62* (2013.01); *G06F 2212/657* (2013.01)

(56) References Cited

U.S. PATENT DOCUMENTS

| | | | |
|---|---|---|---|
| 5,701,432 A * | 12/1997 | Wong | G06F 12/0842 |
| | | | 711/130 |
| 5,809,548 A | 9/1998 | Chang et al. | |
| 6,748,496 B1 | 6/2004 | Scarpino | |
| 6,859,862 B1 | 2/2005 | Liao et al. | |
| 7,120,762 B2 | 10/2006 | Rajwar et al. | |
| 7,168,070 B2 | 1/2007 | Archambault et al. | |
| 7,355,601 B2 | 4/2008 | Andrews et al. | |
| 7,475,291 B2 | 1/2009 | Cardinell et al. | |
| 8,392,661 B1 * | 3/2013 | Metcalf | G06F 12/10 |
| | | | 711/133 |
| 2007/0174554 A1 | 7/2007 | Hutton et al. | |
| 2012/0084514 A1 | 4/2012 | Blinick et al. | |

OTHER PUBLICATIONS

"Optimizing PowerPC 440 and PowerPC 464 Memory Copy Routines", IBM Corporation, Jan. 18, 2008, pp. 1-9.
"Improving CPU Cache Performance", IBM Corporation, IP.com No. IPCOM000192659D, Jan. 27, 2010, pp. 1-2.
K. Inoue, "Lock and Unlock: A Data Management Algorithm for a Security-Aware Cache", IEEE International Conference on Electronics, Circuits and Systems, 2006, pp. 1093-1096.
"CPU Cache", Wikipedia, online [Sep. 20, 2010], http://en.wikipedia.org/wiki/CPU_cache, pp. 1-18.
First Office Action dated Sep. 11, 2014, pp. 12, for U.S. Appl. No. 12/897,555, filed Oct. 4, 2010.
Response dated Dec. 11, 2014, pp. 10, to First Office Action dated Sep. 11, 2014, pp. 12, for U.S. Appl. No. 12/897,555, filed Oct. 4, 2010.
Notice of Allowance dated Mar. 4, 2015, pp. 23, for U.S. Appl. No. 12/897,555, filed Oct. 4, 2010.

* cited by examiner

LOCKING A CACHE LINE FOR WRITE OPERATIONS ON A BUS

CROSS-REFERENCE TO RELATED APPLICATION

This application is a continuation of U.S. patent application Ser. No. 12/897,555, filed Oct. 4, 2010, which application is incorporated herein by reference in its entirety.

BACKGROUND OF THE INVENTION

1. Field of the Invention

The present invention relates to a computer program product, system, and method for locking a cache line for write operations on a bus.

2. Description of the Related Art

A central processing unit (CPU) may write data to a cache for the purpose of writing over a bus to another device in a system. To optimize transferring data over a bus, such as a Peripheral Component Interconnect (PCI) bus, the CPU may gather write data in a cache to burst over the bus in a single transaction, as opposed to multiple individual operations. Existing embedded controller systems use a method of cache line flushes to peripheral busses and hardware to improve overall system performance. This method includes clearing a processor cache line using a Data Cache Block Set to Zero (DCBZ) instruction, filling the cache line with data to be transmitted, and then flushing the cache line using a Data Cache Block Flush (DCBF) instruction. This process avoids any reads from the peripheral hardware, such as that which would occur on the write of a first single word of a cache line to bring the block of data into the cache. It also allows for the write of a cache line of data, typically 32 bytes, to occur as a burst on the peripheral buss rather than being performed as 8 single word writes.

If an interrupt is taken during the building of the cache line, then there is a risk that the cache line could be selected by a cache line replacement algorithm to be cast out and replaced by a new line of data. When the CPU returns from the interrupt, if the cache line was cast out, then the CPU will have to rebuild the cache line by reading the data from an address in memory. The system/hardware may not support a read of data from these addresses (only writes are allowed), so an error condition is created. Existing implementations prevent the data from being cast out from the cache line by disabling interrupts, completing this cache line fill and flush process, and then re-enabling interrupts.

There is a need in the art for improved techniques for performing writes to cache lines and managing the cache lines in cache.

SUMMARY

Provided are a computer program product, system, and method for locking a cache line for write operations on a bus. A cache line is allocated in a cache for a target address. A lock is set for the cache line, wherein setting the lock prevents the data in the cache line from being cast out. Data is written to the cache line. All the data in the cache line is flushed to the target address over a bus in response to completing writing to the cache line.

DETAILED DESCRIPTION

Figure 1:
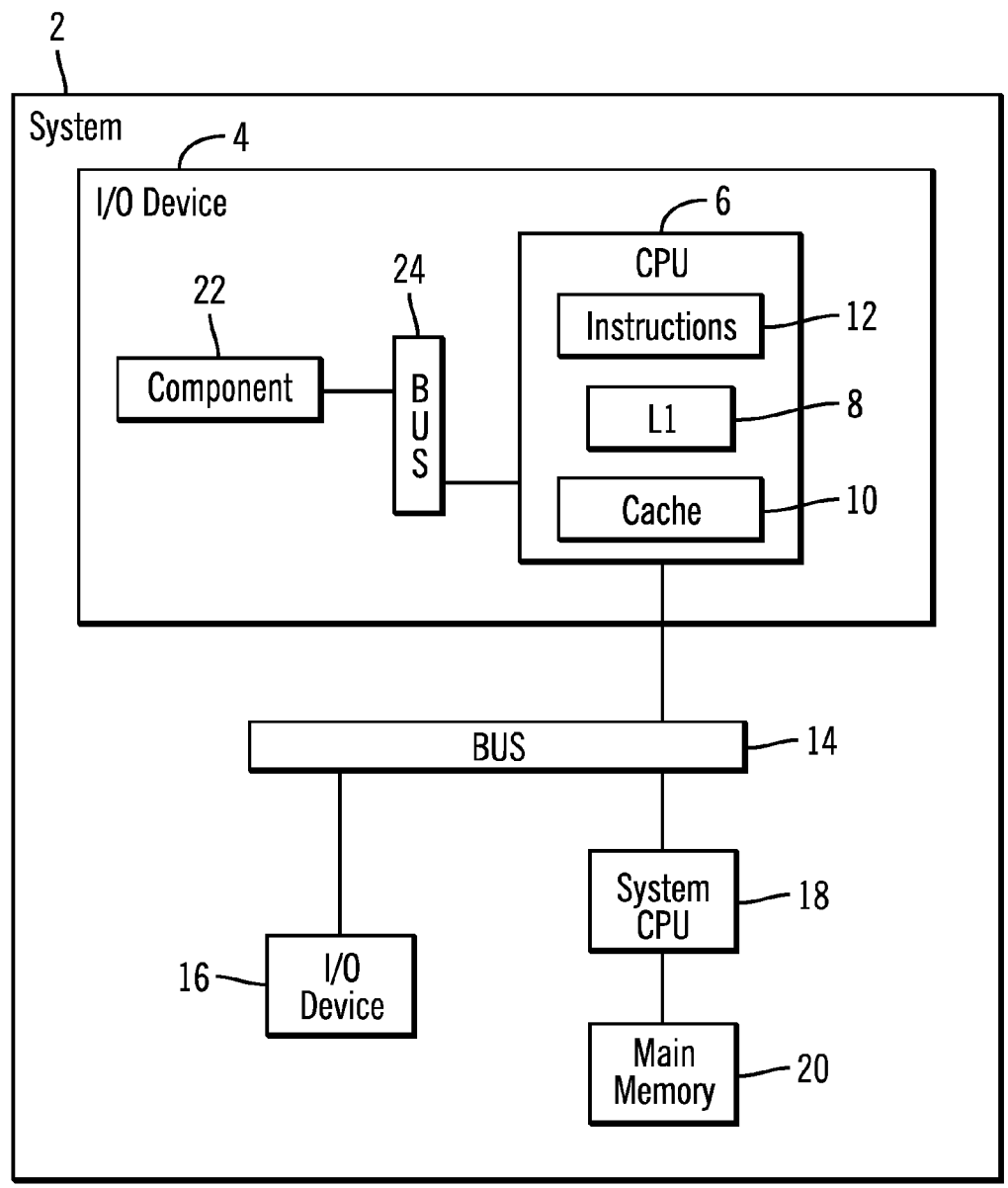
FIG. 1 illustrates an embodiment of a computing environment.

FIG. 1 illustrates an embodiment of a computing environment. A system 2 includes an Input/Output (I/O) device 4, such as a network adaptor, storage adaptor or other I/O device component, that includes a central processing unit (CPU) 6, which may comprise an embedded controller. The CPU 6 may include an L1 cache 8, an additional cache 10, such as an L2 cache, and an instruction set 12 including instructions executed by the CPU 6 to perform adaptor operations and communicate data over a bus 14 to system 2 components. The I/O device 4, an I/O device 16 and a system CPU 18 communicate data and I/O requests over the bus 14. The system CPU 18 may utilize a main memory 20 or system memory. In alternative embodiments, the CPU 6 may comprise the system CPU. In certain embodiments, the CPU 6 may communicate with a component 22, such as a hardware component, e.g., an Application Specific Integrated Circuit (ASIC), or other device, over a bus 24 within the I/O device 2. The device 22 may include a trace buffer to which the CPU 6 writes trace data, such as debugging data, etc.

Further, the cache 10 may comprise a CPU cache, a trace cache storing instructions to write to the device 22 after they have been decoded or retired, one of the multi-level CPU caches, such as L2, etc. Although the cache 10 is shown as included in the CPU 6, the cache 10 may be external to the CPU 6. For instance, if the CPU 6 is comprised of multiple processing units, then the cache 10 may be a cache shared by the processors of the CPU 6. The buses 14 and 16 may comprise a Peripheral Component Interconnect (PCI) bus or other bus interface. The cache 10 and system memory 20 may be implemented as a volatile or non-volatile memory, such as a solid state storage device (SSD) comprised of solid state electronics, such as a EEPROM (Electrically Erasable Programmable Read-Only Memory), flash memory, flash disk, Random Access Memory (RAM), Dynamic Random Access Memory (DRAM), Static Random Access Memory (SRAM), etc.

Figure 2:
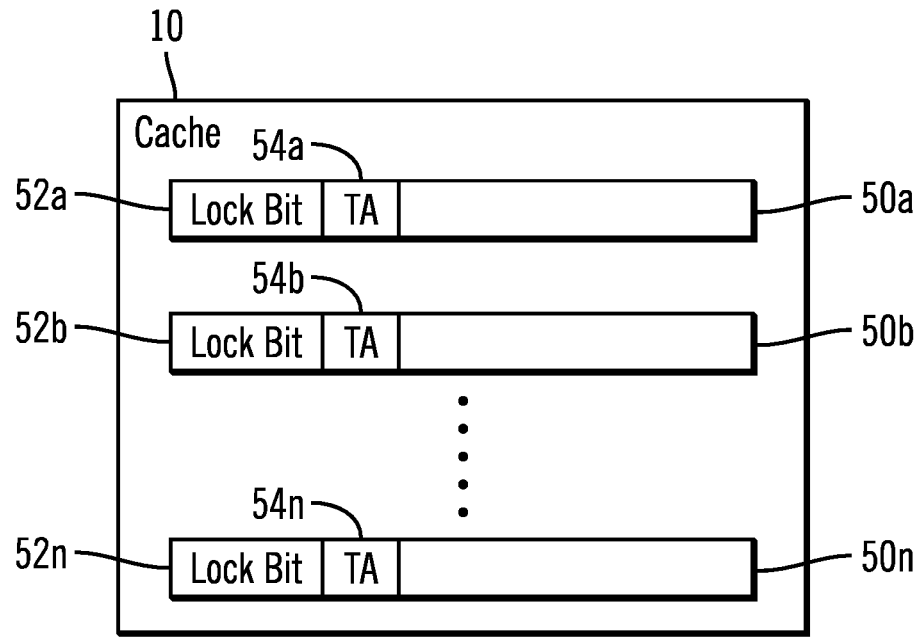
FIG. 2 illustrates an embodiment of a cache.

FIG. 2 illustrates an embodiment of the cache 10 as including a plurality of cache lines 50a, 50b . . . 50n, where each cache line 50a, 50b . . . 50n includes a lock bit 52a, 52b . . . 52n indicating whether the cache line 50a, 50b . . . 50n is locked. A cache line 50a, 50b . . . 50n may comprise 32 bytes, and be comprised of a plurality of words. When a cache line 50a, 50b . . . 50n is locked, as indicated by the lock bit 52a, 52b . . . 52n, then that cache line 50a, 50b . . . 50n will not be cast out or evicted from the cache 10 to make room for new data to add to cache, such as if there is a cache miss, or aged out according to a cache replacement algorithm, such as Least Recently Used (LRU) replacement policy. Each cache line 50a, 50b . . . 50n may further include additional information such as a target address (TA) 54a, 54b . . . 54n to which the cached data is to be directed over the bus 14, which may comprise an address in the main memory 20 or some other device.

Figure 3:
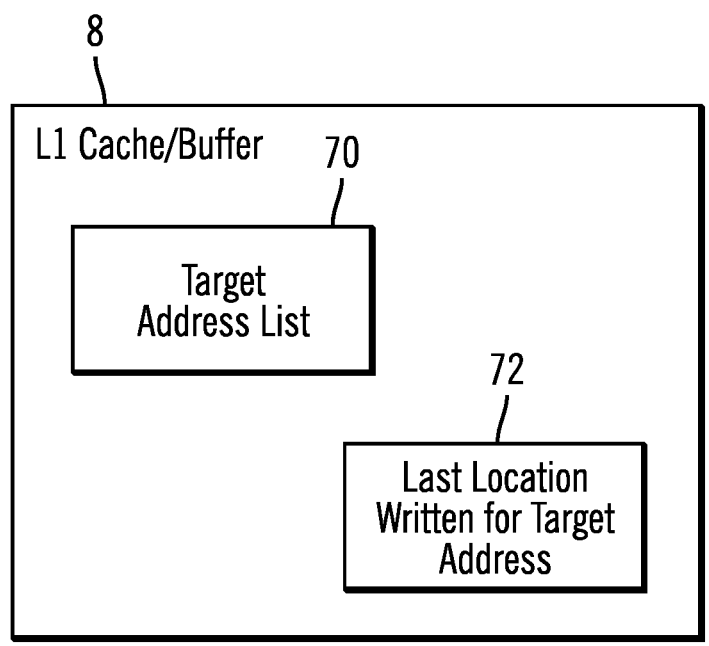
FIG. 3 illustrates an embodiment of information maintained for gathering data in cache.

FIG. 3 illustrates an embodiment of the L1 cache or buffer 8 used by the CPU 6 to maintain data used when filling a cache line 50a, 50b . . . 50n for a burst write. A target address list 70 indicates one or more target addresses in a device over the bus 14 for which cache lines 50a, 50b . . . 50n have been allocated and locked in order to fill for a burst write. The last written location for a target address 72 comprises a last location in a locked cache line 50a, 50b . . . 50n to which the CPU 6 has written before processing an interrupt. After the interrupt, the CPU 6 may return to filling the cache line 50a, 50b . . . 50n with the data for the target address from the last written location 72. In certain described embodiments, the cache line 50a, 50b . . . 50n is locked to fill with data for a burst write. In additional embodiments, the cache line 50a, 50b . . . 50n may be locked to fill for purposes other than a burst write operation over the bus 14.

Figure 4:
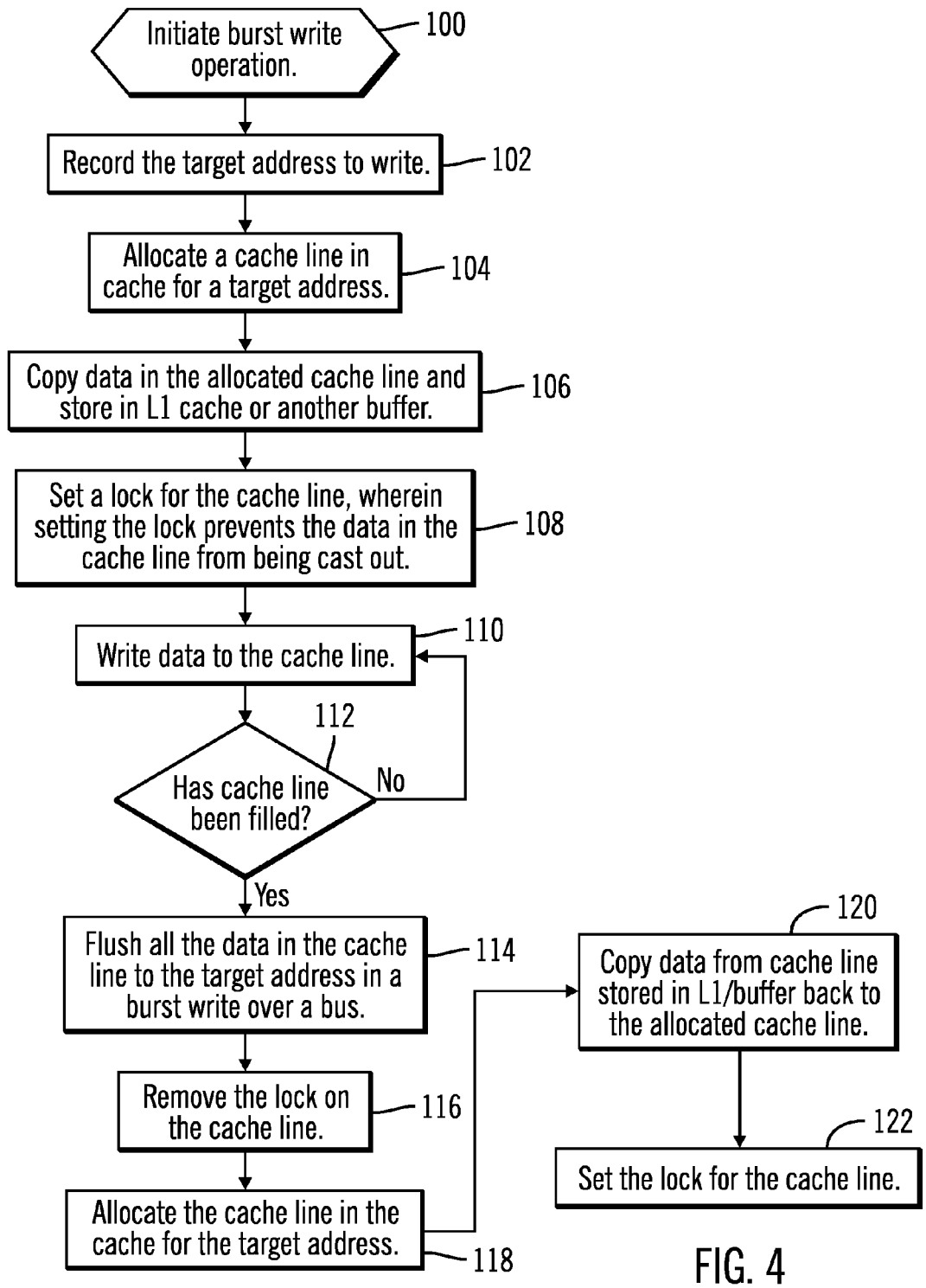
FIG. 4 illustrates an embodiment of operations to fill a cache line.

FIG. 4 illustrates an embodiment of operations implemented in the instructions 12 executed by the CPU 6 to burst write an entire cache line 50a, 50b . . . 50n over the bus 14 to the system CPU 18, to another I/O device 16 on the bus 14 or to a device 22 on the internal bus 24. Upon initiating (at block 100) the burst write operations, the CPU 6 may record (at block 102) the target address to which the cache line 50a, 50b . . . 50n will be written in the target address list 70. The CPU 6 then allocates (at block 104) a cache line 50a, 50b . . . 50n for the target address. In one embodiment, the CPU 6 may allocate a cache line 50a, 50b . . . 50n and set all of the bytes in the cache line to zero. For instance, the CPU 6 may execute a Data Cache Block Set to Zero (DCBZ) command in the instruction set 12 to allocate the cache line 50a, 50b . . . 50n for the corresponding target address, as indicated in field 54a, 54b . . . 54n, and set all of the bytes in the allocated cache line 50a, 50b . . . 50n to zero.

Figure 5:
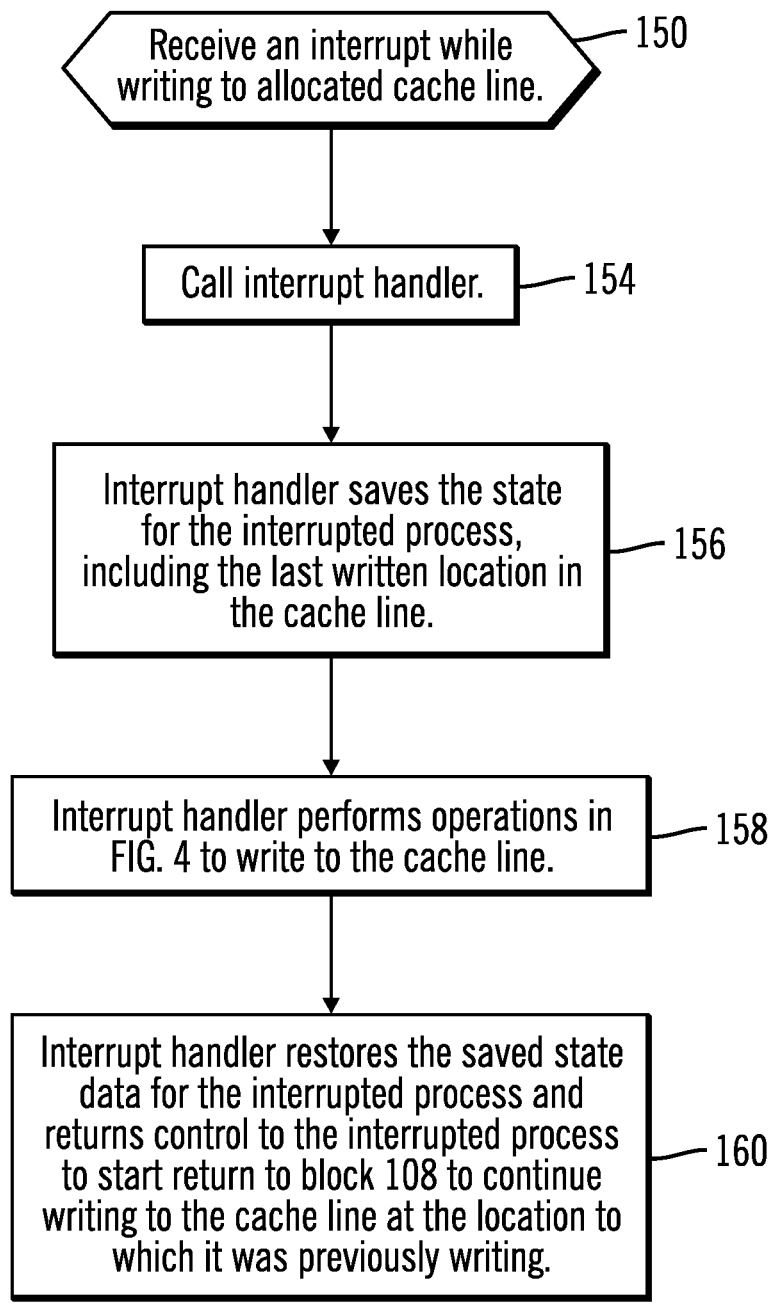
FIG. 5 illustrates an embodiment of operations to process an interrupt.

In certain embodiments, the CPU 6 may copy (at block 106) any data in the allocated cache line 50a, 50b . . . 50n and store in the L1 cache or buffer 8 in the event that the thread performing the operations of FIG. 5 is an interrupt, so that any data in the cache line 50a, 50b . . . 50n may be returned after the interrupt performs the burst write operations of FIG. 5 for the interrupted thread or process to continue with the cache line 50a, 50b . . . 50n in the state before the interrupt.

The CPU 6 then sets (at block 108) a lock 52a, 52b . . . 52n for the allocated cache line 50a, 50b . . . 50n. In certain embodiments, setting the lock may prevent the data in the cache line 50a, 50b . . . 50n from being cast out, aged out or otherwise removed from cache as part of a cache replacement policy or if there is a cache miss. For instance, the CPU 6 may execute a Data Cache Block Touch and Lock Set (DCBTLS) operation to lock the cache line 50a, 50b . . . 50n that was allocated by the previous DCBZ operation. In certain embodiments, locking the cache line 50a, 50b . . . 50n may not prevent the cache line 50a, 50b . . . 50n from being overwritten with data to the target address maintained in the cache line 50a, 50b . . . 50n if the CPU 6 is interrupted by another operation.

After allocating and locking the cache line 50a, 50b . . . 50n, the CPU 6 writes (at block 110) the data to the cache line 50a, 50b . . . 50n for the target address to fill the cache line 50a, 50b . . . 50n. Once the cache line 50a, 50b . . . 50n is filled (from the yes branch at block 112), the CPU 6 executes (at block 114) an instruction to flush all the data in the cache line 50a, 50b . . . 50n to burst write the data to the target address over the bus 14 or 24 in a single operation. For instance, the CPU 6 may execute a Data Cache Block Flush (DCBF) command to flush the entire cache line to the corresponding address in a single operation. After flushing the data, the CPU 6 removes (at block 116) the lock on the cache line 50a, 50b . . . 50n by resetting the lock bit 52a, 52b . . . 52n for the flushed cache line 50a, 50b . . . 50n. In one embodiment, execution of the DCBF command may simultaneously flush the data and free the lock 52a, 52b . . . 52n on the cache line 50a, 50b . . . 50n to allow the cache line 50a, 50b . . . 50n to be used for other data.

To restore the cache line 50a, 50b . . . 50n to the state before the operations of FIG. 4 were initiated, the CPU 6 allocates (at block 118) the cache line 50a, 50b . . . 50n in the cache 10 for the target address and then copies (at block 120) any data for the cache line 50a, 50b . . . 50n, saved at block 106, from the L1 cache/buffer 8 back to the allocated cache line 50a, 50b . . . 50n. The lock 52a, 52b . . . 52n is then set (at block 122) for the cache line 50a, 50b . . . 50n. In certain embodiments, the CPU 6 may execute the DCBZ instruction to allocate the cache line 50a, 50b . . . 50n and the DCBTLS instruction to set the lock. As discussed, the restore related operations may be performed for the case where the thread or process performing the operations of FIG. 4 comprises an interrupt, so that the interrupt handler can return the cache line 50a, 50b . . . 50n to the state prior to the interrupt and lock the cache line 50a, 50b . . . 50n to maintain the availability of the cache line for the interrupted process.

FIG. 5 illustrates an embodiment of operations performed by the CPU 6 executing the operations of FIG. 5 to manage an interrupt received while writing to the allocated cache line 50a, 50b . . . 50n according to the operations of FIG. 4. The CPU 6 may call (at block 154) an interrupt handler to process an interrupt that is received while filling the cache line 50a, 50b . . . 50n according to the operation at block 112 in FIG. 4. The interrupted process may itself comprise an interrupt. In one situation, the interrupt is to perform a write burst operation with respect to the target address and same cache line 50a, 50b . . . 50n currently being written by the interrupted process. The interrupt handler (at block 156) saves the state for the interrupted process, including the last written location 72 in the cache line 50a, 50b . . . 50n to which the interrupted process was writing when the interrupt was received. The interrupt handler then performs (at block 158) the operations in FIG. 4 to perform a burst write to the same target address and cache line 50a, 50b . . . 50n to which the interrupted process was writing. After completing the operations of FIG. 4, which includes restoring the cache line 50a, 50b . . . 50n to the state prior to the interrupt, the interrupt handler restores (at block 160) the saved state data for the interrupted process, including the last location written 72, from the L1 cache or buffer 8, and returns control to the interrupted process so the interrupted process may return to block 108 to continue writing to the cache line at the location to which it was previously writing.

In an alternative embodiment, the interrupt handler may not perform the operations of blocks 106 and 120 to restore the data into the cache line 50a, 50b . . . 50n to the state prior to the interrupt. In such case, the interrupted process would continue filling the cache line 50a, 50b . . . 50n from where it left off when interrupted, but the cache line 50a, 50b . . . 50n will not have the data written prior to the interrupt and be incomplete.

Figure 6:
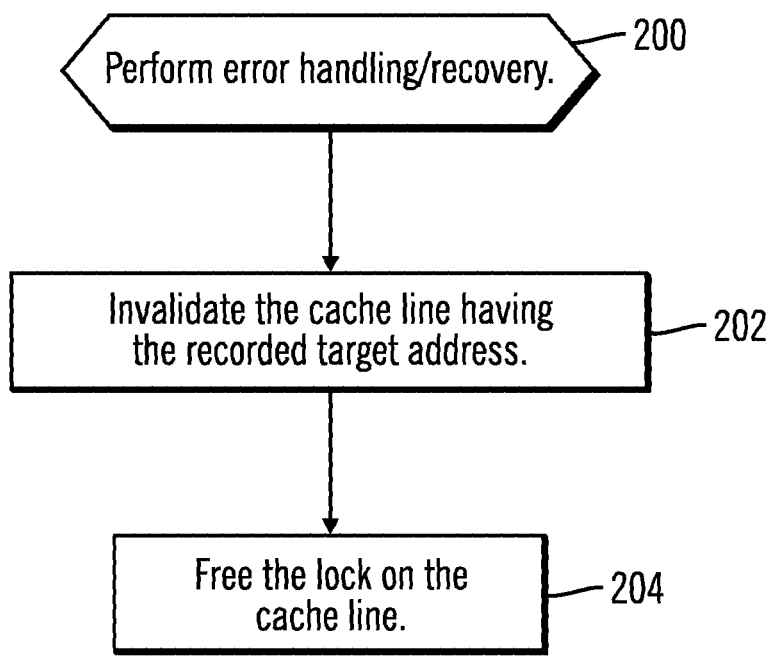
FIG. 6 illustrates an embodiment of operations to perform error handling and recovery.

FIG. 6 illustrates an embodiment of operations performed by the CPU 6 executing the instructions 12 to perform error handling and/or recovery upon detecting an error condition. Upon initiating (at block 200) an error handling or recovery operation with respect to the cache 10, the CPU 6 invalidates (at block 202) the cache line 50a, 50b . . . 50n having the recorded target address, as indicated in the target address list 70, and frees (at block 204) the lock 52a, 52b . . . 52n on the cache line 50a, 50b . . . 50n. If the target address list 70 has multiple target addresses, then all those indicated in the list 70 may be invalidated. In one embodiment, the CPU 6 may execute a Data Cache Block Invalidate (DCBI) instruction on the last recorded target address to invalidate the stale data and free the lock on the cache line 50a, 50b . . . 50n having the data for that target address that was locked and in the process of being filled before the error occurred.

With the described embodiments, the cache line 50a, 50b . . . 50n is locked to prevent the data being cast or aged out as part of a cache replacement algorithm. This allows the CPU 6 to process interrupts while filling the cache line 50a, 50b . . . 50n with data to burst write across the bus 14 without the data being aged or cast out. When the CPU 6 completes the processing of the interrupt, the CPU 6 may return to filling the cache line 50a, 50b . . . 50n for the burst write that was interrupted. In certain embodiments, the interrupt may restore the cache line 50a, 50b . . . 50n to the state prior to the interrupt, so that the interrupted process may continue writing from where it left-off to complete the write burst operation. Further, with the described embodiments, the locked cache line 50a, 50b . . . 50n is flushed after completing the burst write operation over the bus 4.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for bursting writes in a cache, the computer program product comprising a non-transitory computer readable storage medium having computer readable program code embodied therein that executes to perform operations, the operations comprising:
    allocating a cache line in cache for a target address;
    setting a lock for the cache line;
    writing data to the cache line while the lock for the cache line is set;
    processing an interrupt while filling the cache line, wherein the lock prevents the data in the cache line from being cast out while the interrupt is being processed;
    returning to the filling the cache line after completing the processing the interrupt; and
    flushing all the data in the cache line to the target address over a bus in response to completing the writing to the cache line.

2. The computer program product of claim 1, wherein the data in the cache line is flushed as part of a burst write to the target address.

3. The computer program product of claim 1, wherein the operations further comprise:
    removing the lock on the cache line in response to the flushing all the data in the cache line.

4. The computer program product of claim 1, wherein the operations further comprise:
    saving data in the cache line to a buffer before the writing to the cache line; and
    copying the data from the buffer to the cache line after the flushing all the data in the cache line to the target address.

5. The computer program product of claim 1, wherein the operations further comprise:
    recording the target address;
    performing error handling; and
    executing a command to invalidate the data in the cache line allocated to the recorded target address in response to the performing error handling.

6. The computer program product of claim 1, wherein the cache and the non-transitory computer readable storage medium are in an Input/Output (I/O) device wherein the I/O device connects on the bus to an external device, and wherein the data in the cache line is flushed in a burst write over the bus to the external device.

7. The computer program product of claim 1, wherein the cache and the bus are in an Input/Output (I/O) device including a hardware component, and wherein the data in the cache line is flushed in a burst write to the hardware component in the I/O device.

8. A method, comprising:
    allocating a cache line in a cache for a target address;
    setting a lock for the cache line;
    writing data to the cache line while the lock for the cache line is set;
    processing an interrupt while filling the cache line, wherein the lock prevents the data in the cache line from being cast out while the interrupt is being processed;
    returning to the filling the cache line after completing the processing the interrupt; and
    flushing all the data in the cache line to the target address over a bus in response to completing the writing to the cache line.

9. The method of claim 8, wherein the data in the cache line is flushed as part of a burst write to the target address.

10. The method of claim 8, further comprising:
    removing the lock on the cache line in response to the flushing all the data in the cache line.

11. The method of claim 8, further comprising:
saving data in the cache line to a buffer before the writing to the cache line; and
copying the data from the buffer to the cache line after the flushing all the data in the cache line to the target address.

12. The method of claim 8, further comprising:
recording the target address;
performing error handling; and
executing a command to invalidate the data in the cache line allocated to the recorded target address in response to the performing error handling.

13. The method of claim 8, wherein the cache is in an Input/Output (I/O) device wherein the I/O device connects on the bus to an external device, and wherein the data in the cache line is flushed in a burst write over the bus to the external device.

14. The method of claim 8, wherein the cache and the bus are in an Input/Output (I/O) device including a hardware component in the I/O device, and wherein the data in the cache line is flushed in a burst write to the hardware component in the I/O device.

15. A system in communication with an external device over a bus, comprising:
a processor;
a cache;
a computer readable storage medium having instructions executed by the processor to perform operations, the operations comprising:
allocating a cache line in the cache for a target address at the external device;
setting a lock for the cache line;
writing data to the cache line while the lock for the cache line is set;
processing an interrupt while filling the cache line, wherein the lock prevents the data in the cache line from being cast out while the interrupt is being processed;
returning to the filling the cache line after completing the processing the interrupt; and
flushing all the data in the cache line to the target address over the bus to the external device in response to completing the writing to the cache line.

16. The system of claim 15, wherein the data in the cache line is flushed as part of a burst write to the target address.

17. The system of claim 15, wherein the operations further comprise:
removing the lock on the cache line in response to the flushing all the data in the cache line.

18. The system of claim 15, wherein the operations further comprise:
saving data in the cache line to a buffer before the writing to the cache line; and
copying the data from the buffer to the cache line after the flushing all the data in the cache line to the target address.

19. The system of claim 15, wherein the operations further comprise:
recording the target address;
performing error handling; and
executing a command to invalidate the data in the cache line allocated to the recorded target address in response to the performing error handling.

20. The system of claim 15, wherein the cache, the processor, and the computer readable storage medium are in an Input/Output (I/O) device wherein the I/O device connects on the bus to the external device, and wherein the data in the cache line is flushed in a burst write over the bus to the external device.

21. The system of claim 15, wherein the cache, the processor, and the bus are in an Input/Output (I/O) device, wherein the external device comprises a hardware component in the I/O device, and wherein the data in the cache line is flushed in a burst write to the hardware component in the I/O device.

* * * * *